March 21, 1967 M. G. ROYSTON 3,310,407
FERMENTATION PROCESSES FOR THE PRODUCTION OF BEER
Filed July 10, 1964
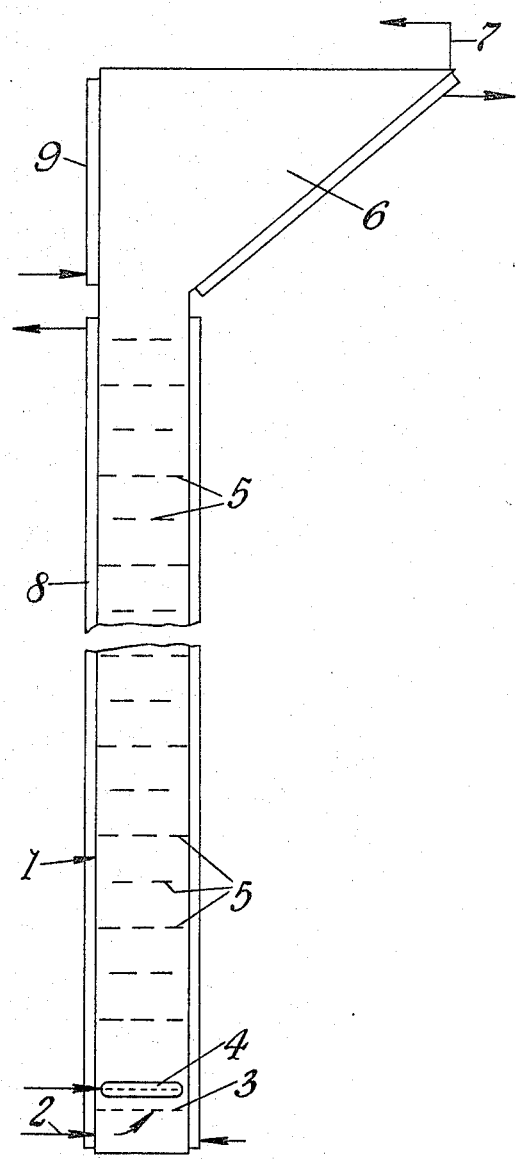

United States Patent Office 3,310,407
Patented Mar. 21, 1967

3,310,407
FERMENTATION PROCESSES FOR THE
PRODUCTION OF BEER
Michael George Royston, Crawley, Sussex, England, assignor to The A.P.V. Company Limited, Crawley, Sussex, England
Filed July 10, 1964, Ser. No. 381,760
4 Claims. (Cl. 99—31)

This invention relates to the continuous production of beer.

This application is a continuation-in-part of my copending application 155,081, filed Nov. 27, 1961, and now abandoned.

The invention concerns the stage at which hopped wort including yeast, as is conventional, is allowed to ferment to produce beer as the final product. In this fermentation stage of production the rate of conversion of the sugar in the wort is a function of the concentration of sugar and of the enzymic yeast cells in the wort.

In the usual continuous method of operation using a fermentation vessel, the contents are stirred and form a homogeneous mixture, i.e. the wort entering the fermentation vessel and having a particular concentration of sugar becomes immediately diluted to conform with the average sugar content of the yeast-containing liquid in the vessel which is also the sugar content of the outgoing fermented product. By using more than one such vessel providing a number of fermentation stages, the rate of fermentation may be increased as the rate of reaction is proportional to the sugar concentration for a given yeast concentration.

It has been found that with a stirred tank process certain flavour characteristics are lost, as compared with a batch process, and it is believed that this is due to the immediate reduction in sugar concentration as the wort enters the fermentation tank.

Now, according to one feature of the present invention, the hopped wort is caused to move continuously into and through a fermentation vessel into which yeast has been introduced in a conventional manner, which vessel is so dimensioned and arranged as to inhibit back flow of the wort and so prevent the intermixing of the progressively fermented wort with the wort passing into the vessel.

The condition in which back flow is minimised or inhibited for practical purposes is that in which the flow of wort is practically uniform, there being no velocity gradient in the plane transverse to the flow of wort. Thus a declining sugar concentration along the wort flow path is maintained. The requirement of a uniform wort velocity distribution necessitates the controlled introduction of the wort for example via a perforated header in order that the uniform velocity of wort across the cross-section is established and the settlement of yeast at the bottom of the fermenting vessel is avoided.

With such a vessel operated under these conditions the fermentation rate is initially very high due to the high initial sugar concentration. The fermentating rate throughout the fermentation zone remains high due to the high yeast cell concentration.

The maintenance of a declining sugar concentration along the fermentation zone, as opposed to the immediate mixing in the stirred tank process, means that the conditions under which fermentation proceeds in any given wort particle are nearer those encountered in a batch fermentation process, in which the sugar concentration of the batch declines as fermentation proceeds.

The yeast cell concentration may be sufficient to form a yeast plug which may be defined as the condition which pertains in a system containing flocculating yeast in which the yeast concentration is so high that the individual clumps of yeast join up. There is therefore a continuous phase or lattice of yeast through which the wort or beer and fermentation gas pass. While a temporary eddy of fermentation gas might break up the lattice momentarily the plug will reform and remain essentially continuous throughout the fermenting zone.

By reason of the invention a high overall rate of fermentation is created which as a result enables the vessel to be of small size, for example in a specific case 1 ft. diameter by 20 ft. high, and hence of low cost and floor space requirements.

It has been found experimentally that a high yeast cell concentration, namely, 20–60% of settled yeast by volume in the fermenting vessel, and the declining sugar concentration enables complete fermentation within 3 to 5 hours compared with 72 hours in the traditional process. Were the fermenting vessel to be operated in a homogeneous manner, i.e. destroying the declining sugar concentration by agitation, the fermentation time would be increased to from 7 to 12 hours. Thus, the valve of both the high yeast content and the declining sugar concentration can be readily demonstrated separately or conjointly.

The limitation of back-mixing in the vessel which would usually be in the form of a tube or tower, is achieved by the use of baffles disposed in the forward flow path of the wort.

The baffles inserted into the fermenting vessel can also be designed to maintain the yeast in a state of suspension by distributing the flow of fermentation gas across the cross-section of the vessel.

Provision can be made for the injection of oxygen or air into the system, and for differential temperature control as by jacketing.

In order to maintain the desired yeast concentration, i.e. the critical plug concentration in the fermenting vessel, it is necessary to prevent the loss of yeast from the system via the effluent beer. To this end a separating zone is provided at the head of the fermenter in which most of the yeast settles and returns to the fermenting vessel while the largely clarified beer is withdrawn as product. The settling back of yeast at the head of the fermenting vessel also ensures that the yeast cell concentration is maintained.

In the accompanying drawing, which shows one mode of carrying the invention into effect by way of example, the fermenting vessel comprises a cylindrical tower 1 forming an elongated fermenting zone and having a high slenderness ratio, i.e. has considerable height compared with its diameter, for example 20 or more to 1. Thus, the tower 1 of the fermenting vessel may have a height of 20 feet and a diameter of 1 foot. In another example a tower of 6 inch diameter may have a height of 15 feet giving a ratio of 30 to 1.

At the lower end of the tower 1, inlet means 2 are provided for introducing the hopped wort preferably so that the inflow of wort to the tower is distributed over the cross section of the tower. Thus, a perforated baffle 3 may be provided, as shown in the drawing, above the point or points of introduction of the wort; alternatively (not illustrated) the wort inlet means may comprise a perforated inlet header from which wort is delivered uniformly over the cross-sectional area of the tower 1.

For the introduction of air or oxygen at the base of the tower 1, a sparging ring 4, similar in construction to an annular gas burner, may be provided with connection to a source of air or oxygen. Above the sparging ring 4 and wort inlet means 2, the interior of the tower 1 is provided with a plurality of successive spaced baffle means 5 which serve to inhibit back flow of the ascending liquid and to assist in maintaining a forward flow of the liquid in which velocity gradients transverse to the said flow are eliminated or reduced to a minimum.

As previously explained, in fermenting apparatus according to the present invention when the apparatus is in full operation, the cell concentration of the yeast will be high and will form a yeast plug above the level of the perforated wort-distributing baffle 3 and the provision of the ascending system of spaced baffle means 5 will further serve to maintain the yeast in a state of suspension both directly and by distributing the flow of fermentation gas across the cross-section of the vessel.

The high yeast concentration develops from an initiating supply of yeast introduced into the vessel at start-up, as is customary in starting up fermentation processes in fermentation vessels, the yeast growth increasing in direct proportion to the sugar conversion taking place as the process proceeds.

In order to prevent loss of yeast with the effluent beer from the head of the tower 1, the tower terminates in a separating zone 6 of increased cross-section which permits settlement of the yeast and its return into the tower. Thus the effluent beer will be largely clarified and only a negligible amount of yeast is carried away from the fermenting vessel along the beer outlet path 7.

The tower 1 and the separating zone 6 may be provided with attempering means, such as the water jacket means 8 and 9 respectively.

The fermentation is initiated from an inoculation of a yeast culture. The yeast culture is grown up from a single cell by standard method commonly used by microbiologists. Thus the cell might be isolated on a wort agar plate and transferred to a second plate from which by successive transfers in liquid wort it is finally contained in a 2 litre Pasteur flask. The tower fermenter is sterilised and sterile wort is introduced slowly. A sterile connection is made between the Pasteur flask and a sample point on the tower and the yeast is run into the tower.

The flow introduction of sterile wort into the tower is continued and the contents are aerated with sterile air. The tower is full after about three days and in this time sufficient yeast has developed to allow the fermentation to proceed, as hereinabove described.

The rate of introduction of wort is increased and the beer overflows continuously from the top of the tower.

Having now grown up the yeast in the tower, no further yeast is added during the course of the continuous fermentation which might extend for six months or more.

*Example*

The fermenter was 6" diameter and 15' high and the fermentation time was five hours.

The fermentation was typical and was operated on wort of 12° balling. The fermentation temperature was 60° F. and was held constant throughout the fermenter. The maximum yeast concentration at the head of the fermenter was 32.8% by weight of yeast at 80% moisture content.

Samples were taken at different points up the tower and gave the following results.

Balling: Degrees
Inlet _____ 12
2' above inlet _____ 10
7' above inlet _____ 9.4
Top _____ 3.1

This indicates the progressive decline in sugar concentration and the progressive increase in the degree of fermentation which is similar to that which occurs in a batch fermentation.

It will be appreciated that considerable modification of the above described construction may be made within the spirit and scope of the present invention provided that there are obtained the necessary conditions in which the back flow of the liquid through the fermenting vessel is inhibited as far as possible so that a progressively declining sugar concentration is provided between the wort inlet and beer outlet without any dilution of the fresh wort with partially fermented wort.

I claim:

1. A process of continuous fermentation in the production of beer comprising introducing an unfermented liquid containing dissolved sugar to one end, and uniformly over the cross-sectional area, of an elongated yeast-containing treatment zone having a high slenderness ratio, said treatment zone including flow controlling baffle means for inhibiting back flow of the liquid, constraining the liquid to flow upwardly and generally unidirectionally from said one end of the treatment zone to the other end, maintaining in and along the treatment zone a high concentration phase of suspended yeast extending across the cross-sectional area of said zone and through which the liquid moving through the treatment zone passes, any general re-circulation of the liquid along its flow path being inhibited by said baffle means, and the sugar concentration in the liquid being allowed to decline progressively and continuously as the liquid passes through the treatment zone while undergoing fermentation.

2. A process of continuous fermentation in the production of beer according to claim 1, and at said other end of the treatment zone providing a separating zone having a cross-sectional area that is large as compared with that of the remainder of said treatment zone and free of baffle means so that the velocity of flow of the liquid is reduced and any suspended yeast entrained in the liquid is allowed to settle.

3. Apparatus for continuous fermentation in the production of beer from an unfermented liquid containing dissolved sugar by the action of yeast, comprising an elongated treatment vessel having a high slenderness ratio, an unfermented liquid inlet at one end of said vessel, a fermented product outlet at the other end, transverse baffle means located in the vessel at least adjacent said inlet, said baffle means having a plurality of orifices distributed over its surface to establish a liquid flow within the vessel uniformly distributed over the cross-sectional area of the vessel, a separating vessel located at the end of the treatment vessel at said outlet and having a cross-sectional that is large as compared with that of said treatment vessel and a fermented product outlet from the separating vessel, the arrangement being such that the liquid introduced at said inlet passes along the treatment vessel where a sugar yeast reaction takes place and reaches the separation vessel whereas yeast carried out of the treatment vessel can settle and return to the treatment vessel while the fermented product can be removed from the fermented product outlet of the separating vessel substantially clear of yeast.

4. A continuous fermentation apparatus for producing beer from the action of yeast on a liquid containing dissolved sugar and comprising a wall means defining an elongated upright chamber having substantially greater length than its transverse dimensions whereby the relation of its length to its cross-sectional area provides a vessel of high slenderness ratio, said wall means being shaped throughout the length thereof to provide constant cross-sectional area, said wall means at the lower end thereof having an inlet for unfermented liquid, the upper end of said wall means at the terminal end of each constant cross-sectional area constituting a fermented product outlet, a plurality of vertically spaced, transversely disposed baffle means within the vessel and extending throughout major portion of the length of said wall means and including a baffle means adjacent said inlet, each said baffle means having a plurality of orifices therethrough to establish a liquid flow within the vessel that is uniformly distributed over the cross-sectional area of the vessel, an unfermented liquid distributing means within the vessel operatively associated with said inlet and having orifices arranged to establish an upwardly directed flow of liquid distributed uniformly throughout the cross-sectional area of the vessel whereby the inlet of unfermented into the vessel and into contact with yeast contained in the vessel establishes a fermentation reaction from the lower portion of the vessel extending upwards, such that the concentration of sugar decreases as the liquid flows upward whereas the yeast concentration increases in the same direction, additional wall means extending upwardly from the terminal end of said first mentioned wall and including portions diverging outwardly and defining a chamber of a cross-sectional area that is substantially greater than that of the vessel, said chamber having an outlet at the upper end for fermented product and said chamber defining a separating vessel wherein yeast carried thereinto from the first mentioned vessel settles out and returns to the first mentioned vessel and fermented product substantially clear of yeast is discharged from the last mentioned outlet.

References Cited by the Examiner
UNITED STATES PATENTS

| | | | |
|---|---|---|---|
| 443,190 | 12/1890 | Gotter | 99—276 |
| 927,944 | 7/1909 | Charmat | 99—276 |
| 1,995,626 | 3/1935 | Schreder | 99—43 |
| 2,188,192 | 1/1940 | Scholler | 195—134 X |
| 2,789,907 | 4/1957 | Hazelbach | 99—43 |

A. LOUIS MONACELL, *Primary Examiner.*

D. M. STEPHENS, *Assistant Examiner.*